(12) United States Patent
Lim et al.

(10) Patent No.: US 12,439,039 B2
(45) Date of Patent: *Oct. 7, 2025

(54) APPARATUS FOR ENCODING AND DECODING IMAGE BY SKIP ENCODING AND METHOD FOR SAME

(71) Applicants: Electronics and Telecommunications Research Institute, Daejeon (KR); Kwangwoon University Industry-Academic Collaboration Foundation, Seoul (KR); University-Industry Cooperation Group of Kyung Hee University, Yongin-si (KR)

(72) Inventors: Sung Chang Lim, Daejeon (KR); Ha Hyun Lee, Seoul (KR); Se Yoon Jeong, Daejeon (KR); Hui Yong Kim, Daejeon (KR); Suk Hee Cho, Daejeon (KR); Jong Ho Kim, Daejeon (KR); Jin Ho Lee, Daejeon (KR); Jin Soo Choi, Daejeon (KR); Jin Woong Kim, Daejeon (KR); Chie Teuk Ahn, Daejeon (KR); Dong Gyu Sim, Daejeon (KR); Seoung Jun Oh, Seongnam-si (KR); Gwang Hoon Park, Seongnam-si (KR); Sea Nae Park, Seoul (KR); Chan Woong Jeon, Jeonju-si (KR)

(73) Assignees: Electronics and Telecommunications Research Institute, Daejeon (KR); Kwangwoon University Industry-Academic Collaboration Foundation, Seoul (KR); University-Industry Cooperation Group of Kyung Hee University, Yongin-si (KR)

( * ) Notice: Subject to any disclaimer, the term of this patent is extended or adjusted under 35 U.S.C. 154(b) by 64 days.

This patent is subject to a terminal disclaimer.

(21) Appl. No.: 18/502,708

(22) Filed: Nov. 6, 2023

(65) Prior Publication Data

US 2024/0073416 A1     Feb. 29, 2024

Related U.S. Application Data

(63) Continuation of application No. 17/711,477, filed on Apr. 1, 2022, now Pat. No. 11,849,110, which is a
(Continued)

(30) Foreign Application Priority Data

| May 7, 2010 | (KR) | 10-2010-0042823 |
| Dec. 1, 2010 | (KR) | 10-2010-0121192 |
| May 6, 2011 | (KR) | 10-2011-0042990 |

(51) Int. Cl.
*H04N 19/117* (2014.01)
*H04N 19/109* (2014.01)
(Continued)

(52) U.S. Cl.
CPC ......... *H04N 19/117* (2014.11); *H04N 19/109* (2014.11); *H04N 19/132* (2014.11);
(Continued)

(58) Field of Classification Search
None
See application file for complete search history.

(56) References Cited

U.S. PATENT DOCUMENTS

| 7,379,499 B2 | 5/2008 | Dahlhoff et al. |
| 7,388,996 B2 | 6/2008 | Lainema et al. |

(Continued)

FOREIGN PATENT DOCUMENTS

| CN | 1281617 A | 1/2001 |
| CN | 1552161 A | 12/2004 |

(Continued)

OTHER PUBLICATIONS

Chujoh, Takeshi et al., "Block-based Adaptive Loop Filter," ITU-Telecommunications Standardization Sector, Study Group 16 Question 6, Video Coding Experts Group (VCEG), 35th Meeting, Berlin, Germany, Jul. 16-18, 2008 (pp. 1-8).

(Continued)

*Primary Examiner* — Leon Viet Q Nguyen
(74) *Attorney, Agent, or Firm* — Michael Best & Friedrich LLP

(57) ABSTRACT

The present invention relates to an apparatus and method for encoding and decoding an image by skip encoding. The
(Continued)

image-encoding method by skip encoding, which performs intra-prediction, comprises: performing a filtering operation on the signal which is reconstructed prior to an encoding object signal in an encoding object image; using the filtered reconstructed signal to generate a prediction signal for the encoding object signal; setting the generated prediction signal as a reconstruction signal for the encoding object signal; and not encoding the residual signal which can be generated on the basis of the difference between the encoding object signal and the prediction signal, thereby performing skip encoding on the encoding object signal.

3 Claims, 4 Drawing Sheets

Related U.S. Application Data continuation of application No. 16/738,307, filed on Jan. 9, 2020, now Pat. No. 11,323,704, which is a continuation of application No. 16/244,854, filed on Jan. 10, 2019, now Pat. No. 10,574,985, which is a continuation of application No. 15/649,330, filed on Jul. 13, 2017, now Pat. No. 10,218,972, which is a continuation of application No. 14/643,785, filed on Mar. 10, 2015, now Pat. No. 9,743,082, which is a continuation of application No. 13/696,786, filed as application No. PCT/KR2011/003401 on May 6, 2011, now Pat. No. 9,002,123.

(51) Int. Cl.
| | |
|---|---|
| H04N 19/132 | (2014.01) |
| H04N 19/159 | (2014.01) |
| H04N 19/17 | (2014.01) |
| H04N 19/174 | (2014.01) |
| H04N 19/176 | (2014.01) |
| H04N 19/192 | (2014.01) |
| H04N 19/46 | (2014.01) |
| H04N 19/50 | (2014.01) |
| H04N 19/593 | (2014.01) |
| H04N 19/82 | (2014.01) |

(52) U.S. Cl.
CPC .......... *H04N 19/159* (2014.11); *H04N 19/17* (2014.11); *H04N 19/174* (2014.11); *H04N 19/176* (2014.11); *H04N 19/192* (2014.11); *H04N 19/46* (2014.11); *H04N 19/50* (2014.11); *H04N 19/593* (2014.11); *H04N 19/82* (2014.11)

(56) References Cited

U.S. PATENT DOCUMENTS

| | | | |
|---|---|---|---|
| 7,532,808 B2* | 5/2009 | Lainema | H04N 19/463 |
| | | | 386/328 |
| 7,991,237 B2 | 8/2011 | Sekiguchi et al. | |
| 8,743,972 B2 | 6/2014 | Dong et al. | |
| 8,842,924 B2 | 9/2014 | Lim et al. | |
| 9,002,123 B2 | 4/2015 | Lim et al. | |
| 9,344,729 B1 | 5/2016 | Grange et al. | |
| 9,743,082 B2 | 8/2017 | Lim et al. | |
| 10,218,972 B2 | 2/2019 | Lim et al. | |
| 10,574,985 B2* | 2/2020 | Lim | H04N 19/192 |
| 11,849,110 B2* | 12/2023 | Lim | H04N 19/176 |
| 2003/0113026 A1 | 6/2003 | Srinivasan et al. | |
| 2004/0126034 A1 | 7/2004 | Yu et al. | |
| 2004/0136458 A1 | 7/2004 | Dahlhoff et al. | |
| 2004/0139138 A1 | 7/2004 | Chen et al. | |
| 2004/0151123 A1 | 8/2004 | Lau et al. | |
| 2005/0013494 A1 | 1/2005 | Srinivasan et al. | |
| 2005/0175103 A1 | 8/2005 | Sun et al. | |
| 2005/0265447 A1 | 12/2005 | Park | |
| 2006/0146941 A1 | 7/2006 | Cha et al. | |
| 2007/0171973 A1 | 7/2007 | Kobayashi | |
| 2007/0206871 A1 | 9/2007 | Jalil et al. | |
| 2008/0025397 A1 | 1/2008 | Zhao et al. | |
| 2008/0130747 A1 | 6/2008 | Moriya et al. | |
| 2008/0199090 A1 | 8/2008 | Tasaka et al. | |
| 2008/0285655 A1 | 11/2008 | Au et al. | |
| 2009/0034856 A1 | 2/2009 | Moriya et al. | |
| 2009/0067495 A1 | 3/2009 | Au et al. | |
| 2009/0086816 A1 | 4/2009 | Leontaris et al. | |
| 2009/0123066 A1 | 5/2009 | Moriya et al. | |
| 2009/0141808 A1 | 6/2009 | Wong | |
| 2009/0161770 A1 | 6/2009 | Dong et al. | |
| 2009/0207911 A1 | 8/2009 | Minamoto | |
| 2009/0225842 A1 | 9/2009 | Cheon et al. | |
| 2009/0304070 A1 | 12/2009 | Lamy-Bergot et al. | |
| 2009/0304086 A1 | 12/2009 | Shi et al. | |
| 2010/0086052 A1 | 4/2010 | Park et al. | |
| 2010/0142617 A1 | 6/2010 | Koo et al. | |
| 2010/0158103 A1 | 6/2010 | Ye et al. | |
| 2010/0177822 A1 | 7/2010 | Karczewicz et al. | |
| 2010/0296574 A1 | 11/2010 | Gordon et al. | |
| 2010/0315557 A1 | 12/2010 | Mathew et al. | |
| 2010/0322316 A1* | 12/2010 | Yoshino | H04N 19/61 |
| | | | 375/E7.125 |
| 2010/0322526 A1 | 12/2010 | Lee et al. | |
| 2011/0038415 A1* | 2/2011 | Min | H04N 19/176 |
| | | | 375/E7.243 |
| 2011/0090960 A1 | 4/2011 | Leontaris et al. | |
| 2011/0090969 A1 | 4/2011 | Sung et al. | |
| 2012/0082224 A1 | 4/2012 | Van Der et al. | |
| 2012/0093217 A1 | 4/2012 | Jeon et al. | |
| 2012/0128070 A1 | 5/2012 | Kim et al. | |
| 2012/0128260 A1 | 5/2012 | Jung et al. | |
| 2012/0213274 A1 | 8/2012 | Lim et al. | |
| 2012/0236936 A1 | 9/2012 | Segall et al. | |
| 2012/0321206 A1* | 12/2012 | Sato | H04N 19/134 |
| | | | 382/233 |
| 2013/0022115 A1 | 1/2013 | Oh | |
| 2013/0028327 A1 | 1/2013 | Narroschke et al. | |
| 2013/0028531 A1 | 1/2013 | Sato | |
| 2013/0044814 A1 | 2/2013 | Guo et al. | |
| 2013/0128961 A1 | 5/2013 | Kim et al. | |
| 2013/0272623 A1 | 10/2013 | Jeon et al. | |
| 2013/0330014 A1 | 12/2013 | Sato | |
| 2014/0254673 A1 | 9/2014 | Min et al. | |
| 2017/0164002 A1 | 6/2017 | Lee et al. | |
| 2020/0154104 A1 | 5/2020 | Lim et al. | |

FOREIGN PATENT DOCUMENTS

| | | |
|---|---|---|
| CN | 1607836 A | 4/2005 |
| CN | 101115201 A | 1/2008 |
| CN | 101233756 A | 7/2008 |
| CN | 101247522 A | 8/2008 |
| CN | 101267560 A | 9/2008 |
| CN | 101273638 A | 9/2008 |
| CN | 101389016 A | 3/2009 |
| CN | 101640802 A | 2/2010 |
| EP | 1720358 A2 | 11/2006 |
| JP | 2001-197506 A | 7/2001 |
| JP | 2007-235886 A | 9/2007 |
| JP | 2008-022404 A | 1/2008 |
| JP | 4268875 B2 | 5/2009 |
| KR | 10-2005-0026318 A | 3/2005 |
| KR | 10-2006-0081886 A | 7/2006 |
| KR | 10-2009-0096659 A | 9/2009 |
| KR | 10-2010-0041217 A | 4/2010 |
| KR | 10-2010-0041441 A | 4/2010 |
| KR | 10-1596829 B1 | 2/2016 |
| WO | 2008/130367 A1 | 10/2008 |
| WO | 2009/051419 A2 | 4/2009 |
| WO | 2009/136743 A2 | 11/2009 |
| WO | 2009/149151 A2 | 12/2009 |

(56) References Cited

FOREIGN PATENT DOCUMENTS

| WO | 2010/030761 A2 | 3/2010 |
|---|---|---|
| WO | 2010/047104 A1 | 4/2010 |
| WO | 2010/091504 A1 | 8/2010 |

OTHER PUBLICATIONS

International Search Report and Written Opinion of the International Searching Authority issued on Jan. 16, 2012, in counterpart International Application No. PCT/KR2011/003401 (17 pages, including English and Korean versions).
Japanese Office Action issued on Jan. 14, 2014, in counterpart Japanese Patent Application No. 2013-509000 (2 pages, in Japanese, no English translation).
Ken McCann et al., "Samsung's Response to the Call for Proposals on Video Compression Technology," JCT-VC 1st Meeting Dresden, JCTVC-A124, (2010). (In English).
Kim et al., "Description of Video Coding Technology Proposal by ETRI," Electronics and Telecommunications Research Institute Joint Collaborative Team on Video Coding (JCT-VC) of ITU-T SG16 WP3 and ISO/IEC JTC1/SC29/WG11 1st Meeting: Dresden, DE, 15-23 JCTVC-A127 Apr. 2010 pp. 1-37 (37 pages in English).
Korean Office Action issued on Apr. 7, 2015, in counterpart Korean Application No. 10-2011-0042990 (4 pages, in Korean, no English translation).
Series, H., "Audiovisual And Multimedia Systems; Infrastructure Of Audiovisual Services—Coding Of Moving Video; Advanced Video Coding For Generic Audiovisual Services" ITU-T: Telecommunication Standardization Sector of ITU, International Telecommunication Union, Version H.264, May 2003, pp. 32, 37.
Thomas Davies, "BBC's Response to the Call for Proposals on Video Compression Technology," British Broadcasting Corporation and Samsung Electronics Co., Ltd., Joint Collaborative Team on Video Coding (JCT-VC) of ITU-T SG16 WP3 and ISO/IEC JTC1/SC29/WG11 1st Meeting: Dresden, DE, 15-23 JCTVC-A125 Apr. 2010 pp. 1-31 (31 pages in English).
W. Wan et al., "Proposal for Scalability Based on Adaptive Prediction," ISO/IEC JTC1/SC29/WG11, MPEG99/M4472, Mar. 9, 1999, presented at 47th MPEG Meeting, Mar. 15-19, 1999, Seoul, Republic of Korea (9 pages, in English).
Wan et al., "International Organisation for Standardisation Organisation Internationale De Normalisation ISO/IEC JTC1/SC29/WG11 Coding of Moving Pictures and Audio," ISO/IEC JTC1/SC29/WG11 MPEG99/M4472 Seoul, Mar. 1999 pp. 1-9 (9 pages in English).
JCT-VC, "Test Model under Consideration", Joint Collaborative Team on Video Coding (JCT-VC) of ITU-T SG16 WP3 and ISO/IEC JTC1/SC29/WG11, 1st Meeting, Dresden, DE, Apr. 15-23, 2010, JCTVC-A205.
Karczewicz, M., et al. "Video coding technology proposal by Qualcomm Inc." JCTVC Contribution JCTVC-A121, Dresden, Germany (2010) (3 pages).
Japanese Office Action issued on Sep. 17, 2024, in counterpart Japanese Patent Application No. 2023-019813 (6 pages with English machine translation).
English Translation of Japanese Office Action issued on Mar. 14, 2025, in counterpart Japanese Patent Application No. 2023-019813 (3 pages).

\* cited by examiner

APPARATUS FOR ENCODING AND DECODING IMAGE BY SKIP ENCODING AND METHOD FOR SAME

CROSS-REFERENCE TO RELATED APPLICATIONS

This application is a continuation of application Ser. No. 17/711,477, filed Apr. 1, 2022, which is a continuation of application Ser. No. 16/738,307, filed Jan. 9, 2020, now U.S. Pat. No. 11,323,704, which is a continuation of application Ser. No. 16/244,854, filed Jan. 10, 2019, which is a continuation of application Ser. No. 15/649,330, filed Jul. 13, 2017, now U.S. Pat. No. 10,218,972 issued on Feb. 26, 2019, which is a continuation of application Ser. No. 14/643,785, filed Mar. 10, 2015, now U.S. Pat. No. 9,743,082 issued on Aug. 22, 2017, which is a continuation of application Ser. No. 13/696,786 having a 371(c) date of Nov. 7, 2012, now U.S. Pat. No. 9,002,123 issued on Apr. 7, 2015, which is a U.S. national stage application of International Application No. PCT/KR2011/003401 filed on May 6, 2011. This application claims the benefit of Korean Application Nos. 10-2010-0042823 filed on May 7, 2010; 10-2010-0121192 filed on Dec. 1, 2010; and 10-2011-0042990 filed on May 6, 2011. The entire contents of application Ser. No. 15/649,330, application Ser. No. 14/643,785, application Ser. No. 13/696,786, International Application No. PCT/KR2011/003401, and Korean Application Nos. 10-2010-0042823, 10-2010-0121192, and 10-2011-0042990 are incorporated herein by reference for all purposes.

BACKGROUND

1. Field

The present invention relates to image signal coding, and more particularly, to an apparatus and a method for coding and decoding an image signal using skip coding.

2. Description of Related Art

There is a need to code an image signal so as to effectively write still pictures or moving pictures in a storage medium or effectively transmit the still pictures or the moving pictures. Various methods have been proposed so as to improve efficiency at the time of coding. As a representative method, there are a method of using temporal prediction and a method of using spatial prediction.

The temporal prediction is to detect a prediction block having the smallest residual coefficients for object blocks of a current frame from other frames temporally approaching the current frame and is referred to as inter prediction.

The spatial prediction uses reconstructed pixel values of reference blocks adjacent to object blocks within a single frame to obtain prediction pixel values of the object blocks and is referred to as intra prediction.

Deblocking filtering may not be applied to spatially adjacent reconstructed signals that are used during a process of performing the intra prediction according to the related art, such that blocking artifacts occur. In addition, the adjacent reconstructed signals use only pixels in an integer pel unit. Further, the process of performing the intra prediction according to the related art is performed by using only the object signals of coding and the adjacent reconstructed signals, such that the spatially limited intra prediction is performed.

SUMMARY

The present invention provides an apparatus and method for coding and decoding an image using skip coding capable of increasing performance of coding and decoding by generating prediction signals similar to coding object signals using reconstructed signals and skipping residual signals generated by a difference between original image signals and the prediction signals from a coding object during a coding process of an image signal.

The present invention also provides an apparatus and method for coding and decoding an image capable of increasing performance of image signal coding and decoding by using skip coding during an intra coding process.

In an aspect, there is provided an image coding method using skip coding, including: performing filtering on signals reconstructed earlier than coding object signals within coding object images at the time of performing intra prediction; generating prediction signals of the coding object signals using the filtered reconstructed signals; and skip coding the coding object signals by setting the generated prediction signals as the reconstructed signals of the coding object signals and by not coding residual signals generated based on a difference between the coding object signals and the prediction signals.

The performing of the filtering may perform the filtering by using at least one of a low pass filter, a deblocking filter, an adaptive loop filter, an interpolation filter, and a noise removing filter.

The performing of the filtering step-by-step may perform at least one of a low pass filter, a deblocking filter, an adaptive loop filter, an interpolation filter, and a noise removing filter.

The performing of the filtering may reconstruct all the reference images of the coding object images and then, performs the filtering on the reconstructed reference images, at the time of performing the intra prediction.

The performing of the filtering may partially reconstruct the reference images of the coding object images and then, perform the filtering on the reconstructed reference images, at the time of performing the intra prediction.

The generating of the prediction signals may generate the prediction signals by performing extrapolation for each direction, based on reconstructed pixels adjacent to the coding object signals.

The generating of the prediction signals may generate the prediction signals by performing template matching between reconstructed pixels adjacent to the coding object signals and the filtered reconstructed signals.

The generating of the prediction signals may generate the prediction signals by performing displaced intra prediction between the coding object signals and the filtered reconstructed signals.

The generating of the prediction signals may generate the prediction signals by performing inter-layer intra prediction, using the filtered reconstructed signals within a base layer spatially corresponding to positions of the coding object signals within an enhancement layer.

The generating of the prediction signals may generate the prediction signals by performing inter-view intra prediction, using the filtered reconstructed signals within a base view spatially corresponding to positions of the coding object signals within an enhancement view.

The image coding method using skip coding may further include transmitting an indicator indicating that the coding object signals are skip-coded to a decoder, without coding the residual signals.

In another aspect, there is provided an image coding apparatus using skip coding, including: a filtering unit that performs filtering on signals reconstructed earlier than coding object signals within coding object images at the time of performing intra prediction; a prediction signal generator that generates prediction signals of the coding object signals using the filtered reconstructed signals; a skip coder that performs skip coding on the coding object signals by setting the generated prediction signals as the reconstructed signals of the coding object signals and by not coding residual signals generated based on a difference between the coding object signals and the prediction signals; and an indicator indicating that the coding object signals are skip-coded, without coding the residual signals.

In another aspect, there is provided an image decoding method using skip coding, including: performing filtering on signals reconstructed earlier than decoding object signals, based on an indicator for skip coding included in the decoding object signals within decoding object images, at the time of performing intra prediction; generating prediction signals of the decoding object signals using the filtered reconstructed signals; and decoding the decoding object signals by setting the generated prediction signals as the reconstructed signals of the decoding object signals and by not decoding residual signals.

In another aspect, there is provided an image decoding apparatus using skip coding, including: an indicator for skip coding included in decoding object signals within decoding object images transmitted from a skip coder, at the time of performing intra prediction; a filtering unit that performs filtering on signals reconstructed earlier than the decoding object signals, based on the indicator; a prediction signal generator that generates prediction signals of the decoding object signals, based on the filtered reconstructed signals and the indicator; and a skip decoder that decodes the decoding object signals by not decoding residual signals.

As set forth above, the exemplary embodiment of the present invention can provide the apparatus and method for coding and decoding an image using the skip coding capable of increasing the performance of coding and decoding by generating the prediction signals similar to the coding object signals using the reconstructed signals and skipping the residual signals generated by the difference between the original image signals and the prediction signals from the coding object during the coding process of the image signal.

In addition, the exemplary embodiment of the present invention can remove image noise, blocking artifacts, quantization errors, aliasing, or the like, by performing various filtering on the reconstructed decoding object images or the previously reconstructed images.

Further, the exemplary embodiment of the present invention can generate the prediction signals similar to the coding object signals by using the filtered reconstructed signals through various methods.

Moreover, the exemplary embodiment of the present invention can increase the performance of the image coding by skipping the coding process of the residual signals that are generated by the difference between the original image signals and the prediction signals.

DETAILED DESCRIPTION

Hereinafter, exemplary embodiments of the present invention will be described in detail with reference to the accompanying drawings.

Figure 1:
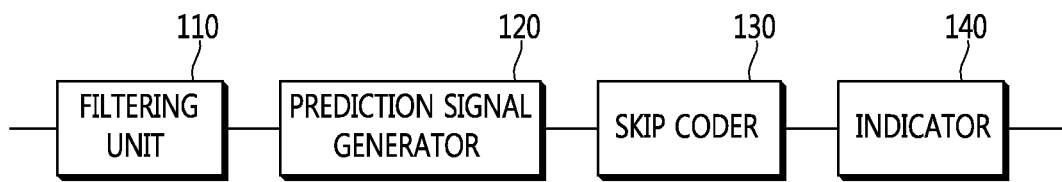
FIG. 1 is a block diagram of an image coding apparatus using skip coding according to an exemplary embodiment of the present invention.

FIG. 1 shows a block diagram of an image coding apparatus using skip coding according to an exemplary embodiment of the present invention.

Referring to FIG. 1, the image coding apparatus using skip coding according to the exemplary embodiment of the present invention may include a filtering unit 110, a prediction signal generator 120, a skip coder 130, and an indicator 140.

The filtering unit 110 performs filtering on reconstructed signals earlier than coding object signals within coding object images at the time of performing intra prediction. The coding object image means a portion to be coded in original images. The coding object image may be all of the original images and a portion of the original images. The coding object image may include the coding object signal. The coding object signals may be signals obtained by differentiating the coding object image in a unit of a pixel, a block, a unit, a picture, and a frame. That is, the coding object signals conceptually include a coding object pixel, a coding object block, a coding object unit, a coding object picture, and a coding object frame. The coding object images may include signals reconstructed earlier than the coding object signals. The reconstructed signals may include signals reconstructed after some of the plurality of signals included in the coding object image are subjected to coding.

The filtering unit 110 performs low pass filtering on the signal reconstructed earlier than the coding object signals, thereby reducing noise present in the reconstructed signals. In this case, the filter coefficients used for the low pass filter are coded, which may be in turn transmitted to a decoder.

For example, low pass filtering may be performed on adjacent reconstructed reference samples used at the time of performing the intra prediction. In this case, the filtering may be performed one time, two times, $N_f$ times, or the like. In this case, $N_f$ indicates any positive integer.

In addition, whether the filtering is performed may depend on coding parameters. That is, it may be determined whether the filtering is applied according to the block size of the coding object signals, the intra prediction mode, whether there are residual signals in the adjacent blocks, whether constrained intra prediction (CIP) is used, and at least one discrimination among the intra prediction direction similarities of the adjacent blocks.

In addition, if it is determined that the filter is applied, a tap size indicating the number of input samples of the filter, coefficients of the low pass filter, filter strength, or the like, may differ. In this case, the tap size may perform the filtering by using at least one filter tap among 2-tap, 3-tap, and Nt-tap. In this case, $N_t$ indicates any positive integer.

In addition, the filtering unit 110 may perform deblocking filter on the reconstructed signals to reduce the blocking artifacts present in the reconstructed signals. The blocking artifacts occur due to errors of quantization that is performed during the image coding process.

For example, the deblocking filter may be performed as follows.

First, it is possible to discriminate a boundary of the objects to be filtered. Basically, it may be determined that the images used during the image coding and decoding processes is the boundary of the objects to be filtered in a coding and decoding unit where the image is partitioned.

In this case, any one of a boundary of coding units, a boundary of prediction units, and a boundary of transform units may be the boundary of the objects to be filtered. The filtering of boundary discrimination may be performed as a unit of a coding unit, a unit of the largest coding unit (LCU), a slice unit, and a picture unit.

Second, it may be determined whether the filtering is performed by using at least one of result values of a formula using the filter strength of the boundary of the filtering objects and pixel values around the boundary.

For example, the filter strength may indicate the tap size indicating the number of input samples of the low pass filter, the coefficients of the low pass filter, or the like, when the filtering is performed on the reconstructed samples present around the boundary. In this case, the coding parameters may be used so as to determine the filter strength. For example, at least one of an intra prediction mode, an inter prediction mode, a motion vector, a reference image index, and a coding block flag may be used. For example, the result values of the formula using the pixel values around the boundary may discriminate whether the filtering object boundary is the blocking artifacts due to the transform and the quantization or real edges present in the image.

Third, the filtering is performed on the filtering object boundary by using the information regarding the determined filtering object boundary and whether the filtering is performed. In this case, the filtering may be performed by the low pass filter that smoothes the pixel values around the boundary so that the edge due to variation of pixel value, etc., is not visible to the human eye and a Wiener filter so as to minimize distortion in the original images, or the like, on the basis of variations of the pixel values around the boundary, or the like. In addition, a one-dimensional filter or a multi-dimensional filter of two dimensions or more may be used according to the filtering object boundary.

For example, the multi-dimensional filter of two dimensions or more may have a shape of the filter, such as quadrangle, circle, rectangle, or the like, and a structure of the filter coefficients, such as a horizontal symmetry, a vertical symmetry, a diagonal symmetry, or the like.

In addition, the above-listed various filters may be used in a filtering execution unit according to the filter strength determined in a unit of determining whether the filtering is performed, or the like. For example, when the coding and decoding processes including the intra prediction, the inter prediction, the transform/inverse transform, the quantization/dequantization, and the entropy coding/entropy decoding are performed in the slice unit, the unit of the largest coding unit (LCU), or the unit of the coding unit (CU), while the deblocking filtering may be performed in the slice unit, the unit of the LCU, or the unit of the CU. When the series of coding and decoding processes including the deblocking filtering are performed in the coding and decoding object LCU and the spatially adjacent LCU, the reconstructed samples in the LCU that are subjected to the deblocking filtering may be used at the time of performing the intra prediction of the coding and decoding object LCU. That is, the reconstructed samples in the LCU that are subjected to the deblocking filtering may be used in the following prediction signal generator 120.

In addition, the filtering unit 110 performs an adaptive loop filtering on the reconstructed signals based on the Wiener filter, thereby reducing the quantization errors present in the reconstructed signals. In this case, the filter coefficients used for the adaptive loop filter are coded, which may be in turn transmitted to the decoder.

For example, the adaptive loop filtering may be performed as follows.

The filtering may be performed on the reconstructed samples, to which the deblocking filtering is applied, in the sample unit or an N×M (N and M are any positive integer) block unit, based on the adaptive loop filter coefficients transmitted to the decoder. In this case, the samples and the blocks to which the adaptive loop filtering is applied may be determined using a filter map indicating whether the adaptive loop filtering is performed. The filter map may be transmitted from the coder to the decoder, being included in a bitstream, together with the filter coefficients. In addition, the filter may differ according to the samples and the blocks to which the adaptive loop filter is applied and various filter tap sizes and filter shapes may be used. When the adaptive loop filtering is applied to the samples and the blocks, what filter is used may be determined by the formula using the reconstructed samples to which the deblocking filtering is applied.

For example, when the coding and decoding processes including the intra prediction, the inter prediction, the transform/inverse transform, the quantization/dequantization, the entropy coding/entropy decoding, and the deblocking filtering are performed in the adaptive loop filtering in the slice unit, the unit of the largest coding unit (LCU), or the unit of the coding unit (CU), while the adaptive loop filtering may be performed in the slice unit, the unit of the LCU, or the unit of the CU. In this case, when the series of coding and decoding processes including the adaptive loop filtering are performed in the coding and decoding object LCU and the spatially adjacent LCU, the reconstructed samples in the LCU that are subjected to the adaptive loop filtering may be used at the time of performing the intra prediction of the coding and decoding object LCU. That is, the reconstructed samples in the LCU that are subjected to the adaptive loop filtering may be used in the following prediction signal generator 120.

In addition, the filtering unit 110 performs interpolation filtering on the reconstructed signals, thereby reducing an aliasing phenomenon present in the reconstructed signals. The filtering unit 110 may perform the interpolation filtering in a sub-pel unit. In this case, the interpolation filtering of the reconstructed signals may be performed on a luminance signal of ½ precision, a chrominance signal of ¼ precision, or the like. An example of the interpolation filtering method may include a bilinear interpolation method, an average interpolating method, or the like and the interpolation filtering may be performed with ⅛, 1/16, 1/32, $1/N_i$ ($N_i$ is any integer), or the like. In this case, the interpolated samples may be used in the prediction signal generator 120. That is, the interpolated values may be the prediction signals and new prediction signals may be generated by using the interpolated values.

In addition, the filtering unit 110 may perform noise removing filtering from the reconstructed signals to remove or reduce the noise present in the reconstructed signals.

In addition, the filtering performed in the filtering unit 110 may be applied to both of the luminance components and the chrominance components of the reconstructed signals.

In addition, the filtering unit 110 may perform the filtering on the reconstructed reference images after all the reference images of the coding object images are reconstructed at the time of performing the intra prediction or the inter prediction and may perform the filtering on the reconstructed reference images after the reference images of the coding object images are partially reconstructed. In this case, the filtering unit 110 may step-by-step perform at least one of the low pass filter, the deblocking filter, the adaptive loop filter, the interpolation filter, and the noise removing filter on the reconstructed signals.

For example, the low pass filter may be performed on the reconstructed signals and the deblocking filter may be performed on the reconstructed signals on which the low pass filter is performed.

For example, the low pass filter may be performed on the reconstructed signals and the interpolation filter may be performed on the reconstructed signals on which the low pass filter is performed.

For example, the deblocking filter may be performed on the reconstructed signals and the adaptive loop filter may be performed on the reconstructed signals on which the deblocking filter is performed.

For example, the adaptive loop filter may be performed on the reconstructed signals and the interpolation filter may be performed on the reconstructed signals on which the adaptive loop filter is performed.

For example, the low pass filter may be performed on the reconstructed signals, the deblocking filter may be performed on the reconstructed signals on which the low pass filter is performed, and the adaptive loop filter may be performed on the reconstructed signals on which the low pass filter and the deblocking filter is performed.

For example, the low pass filter may be performed on the reconstructed signals, the deblocking filter may be performed on the reconstructed signals on which the low pass filter is performed, and the interpolation filter may be performed on the reconstructed signals on which the low pass filter and the deblocking filter is performed.

For example, the deblocking filter may be performed on the reconstructed signals, the adaptive loop filter may be performed on the reconstructed signals on which the deblocking filter is performed, and the interpolation filter may be performed on the reconstructed signals on which the deblocking filter and the adaptive loop filter are performed.

As in the above example, the reconstructed signals on which various filters are performed step-by-step may be used in the following prediction signal generator 120.

The prediction signal generator 120 may generate the prediction signals of the coding object signals by using the reconstructed signals filtered by the filtering unit 110.

The prediction signal generator 120 may generate the prediction signals by performing template matching. The template matching may be performed using pixel similarity between the reconstructed pixels adjacent to the coding object signals and the reconstructed signals filtered by the filtering unit 110. In this case, the pixel similarity may be measured by sum of absolute difference (SAD), sum of absolute transformed difference (SATD), and sum of squared difference (SSD).

When template matching is performed, since the reconstructed pixels adjacent to the coding object signals from the coder and the decoding object signals from the decoder are the same, the same prediction signals may be generated in the coder and the decoder without a separate indicator for template matching. That is, the coder and the decoder may generate the prediction signals by using the same template.

The size of the template used for template matching may be adaptively selected according to an operation processing rate in the image coding process, a memory, or the like. Further, the prediction signal generator 120 may generate the prediction signals by using the plurality of filtered reconstructed signals among the filtered reconstructed signals.

In addition, the prediction signal generator 120 may generate the prediction signals by performing displaced intra prediction. The displaced intra prediction may be performed using the pixel similarity between the coding object signals and the reconstructed signals filtered by the filtering unit 110.

The displaced intra prediction uses displacement vectors. The displacement vectors indicate positions of the filtered reconstructed signals having the most similar values to the coding object signals. The coder may transmit the displacement vectors to the decoder and the decoder may generate the same prediction signals as the coder using the reconstructed signals present in the positions of the displacement vectors. The decoder may generate the prediction signals without greatly increasing computation complexity by using the displacement vectors transmitted from the coder. In addition, the prediction signal generator 120 may use, as the displacement vector prediction values of the coding object signals, the displacement vectors present in the reconstructed signals around the coding object signals. The prediction signal generator 120 may generate the prediction signals by searching the adjacent areas of the coding object signals based on the displacement vector prediction values. In addition, the coder may transmit the displacement vector prediction values and difference values between the displacement vectors of the adjacent areas searched in the coding object signals to the decoder.

In addition, the prediction signal generator 120 may search the most similar initial point to the coding object signals among the filtered reconstructed signals by performing template matching and may generate the prediction signals by performing the displaced intra prediction at the initial point. In addition, the prediction signal generator 120 may search the most similar initial point to the coding object signals among the filtered reconstructed signals by performing the displaced intra prediction and may generate the prediction signals by performing template matching at the initial point.

Further, the prediction signal generator 120 performs the reconstructed pixels adjacent to the coding object signals to perform line based intra prediction, thereby generating the prediction signals. The line based intra prediction is a method of performing extrapolation on the reconstructed pixels around the coding object signals, for each direction based on the coding object signals.

In this case, the number of directions may be at least one, that is, plural. For example, the number of directions may be 2, 4, 8, 16, 33, or the like. The directions and the number of directions may be fixed in advance. Further, the directions and the number of directions may be adaptively defined using the reconstructed pixels.

In this case, when extrapolation is performed for each direction, the filtering unit 110 may use at least one method. For example, extrapolation may be performed using the signals obtained according to whether the low pass filter is applied and by making the method different or according to whether the interpolation filter is applied and by making the method different, for each direction.

In addition, a weighted sum of at least two reconstructed pixels may be used at the time of performing the extrapolation and weights may differ according to a size of a distance or a block. For example, the weighted sum of the prediction signals corresponding to the similar directions may be final prediction signals.

In addition, the prediction signal generator 120 uses the reconstructed signals in a base layer spatially corresponding to the positions of the coding object signals and the coding object signals within an enhancement layer having spatial resolution, image quality, frame rate, or the like, that are equal to or higher than a base layer to perform inter-layer intra prediction, thereby generating the prediction signals.

For example, when the spatial resolution of the base layer is equal to the spatial resolution of the enhancement layer, the reconstructed signals within the base layer are used in the intra prediction of the coding object signals within the enhancement layer, thereby generating the prediction signals.

For example, when the spatial resolution of the base layer is different from the spatial resolution of the enhancement layer, the reconstructed signals within the base layer are used in the intra prediction of the coding object signals within the enhancement layer by controlling the spatial resolution of the base layer through upsampling or downsampling, or the like, so as to match the spatial resolution of the enhancement layer, thereby generating the prediction signals.

In addition, the prediction signal generator 120 uses the coding object signals within an enhancement view and the reconstructed signals within a base view spatially corresponding to the positions of the coding object signals to perform inter-view intra prediction, thereby generating the prediction signals.

For example, when the spatial resolution of the base view is equal to the spatial resolution of the enhancement view, the reconstructed signals within the base view are used in the intra prediction of the coding object signals within the enhancement view, thereby generating the prediction signals.

For example, when the spatial resolution of the base view is different from the spatial resolution of the enhancement view, the reconstructed signals within the base view are used in the intra prediction of the coding object signals within the enhancement view by controlling the spatial resolution of the base view through the upsampling or the downsampling, or the like, so as to match the spatial resolution of the enhancement view, thereby generating the prediction signals.

In addition, the prediction signal generator 120 may generate the prediction signals by using the coding object signals partitioned into the blocks having any size. In this case, the prediction signals may be generated by one of the line based intra prediction, template matching, the displaced intra prediction, the inter-layer intra prediction, and the inter-view intra prediction. The prediction signal generator 120 may generate the prediction signals using the plurality of partitioned coding object signals by the method of generating the same prediction signals and/or by the method of generating different prediction signals.

The skip coder 130 sets the prediction signals generated in the prediction signal generator 120 as the reconstructed signals of the coding object signals. The set reconstructed signals may be used at the time of coding the next coding object signals of the coding object images. In addition, the skip coder 130 performs the skip coding on the coding object signals by not coding the residual signals. The skip coder 130 does not perform the transform coding, the quantization, and the entropy coding on the residual signals.

The skip coder 130 may perform the skip coding by partitioning the coding object signals into any block size. In this case, the block size of the coding object signals that are skip-coded may be determined as a size of any integer N×M. The information regarding the indicator and the block size for the skip coding corresponding to the block size of each coding object signal may be transmitted to the decoder as many as any integer L per a macroblock. When the macroblock is partitioned into a size of N×M, the number of blocks included in the macroblock may be referred to L.

The indicator 140 may indicate that the coding object signals are skip-coded without coding the residual signals. The indicator 140 indicating the skip coding may have a flag type or a macroblock mode type. In addition, the indicator 140 may indicate the method of generating the prediction signals. That is, the indicator 140 may indicate that the prediction signals are generated by any one of the line based intra prediction, the template matching, the displaced intra prediction, the inter-layer intra prediction, and the inter-view intra prediction. In this case, the indicator 140 indicating the method of generating the prediction signals may have a flag type or a macroblock mode type. In addition, the indicator 140 may indicate a filtering method. The indicator 140 may indicate that the filtering is performed by any one of the filtering methods for the reconstructed signals including the low pass filter, the deblocking filter, the adaptive loop filter, the interpolation filter, or the noise removing filter. In addition, the indicator 140 may indicate that at least one of the filtering methods for the reconstructed signals is performed. For example, the indicator 140 may indicate whether the low pass filter is applied to the reconstructed signals and the deblocking filter is applied thereto, whether the low pass filter is applied to the reconstructed signals and the interpolation filter is applied thereto, whether the deblocking filter is applied to the reconstructed signals and the adaptive loop filter is applied thereto, whether the adaptive loop filter is applied to the reconstructed signals and the interpolation filter is applied thereto, whether the low pass filter is applied to the reconstructed signals, whether the deblocking filter is applied thereto and the adaptive loop filter is applied thereto, whether the low pass filter is applied to the reconstructed signals, the deblocking filter is applied thereto, and the interpolation filter is applied thereto, and the deblocking filter is applied to the reconstructed signals, the adaptive loop filter is applied thereto, and the interpolation filter is applied thereto. In this case, the indicator 140 for the filtering method may have a flag type or a macroblock mode type.

The coder performs entropy coding on the indicator by arithmetic coding, variable length coding, or the like, and inserts the coded indicator into a bitstream. The decoder performs entropy decoding on the entropy coded indicator in the bitstream, thereby discriminating whether the skip coding is performed, the method of generating the prediction signals, or the filtering method.

The indicator 140 indicating the skip coding, the method of generating the prediction signals, and the filtering method may be transmitted from the coder to the decoder. In this case, the decoder may use the prediction signals generated in the decoder as the reconstructed signals of the decoding object signals without decoding the residual signals.

Figure 2:
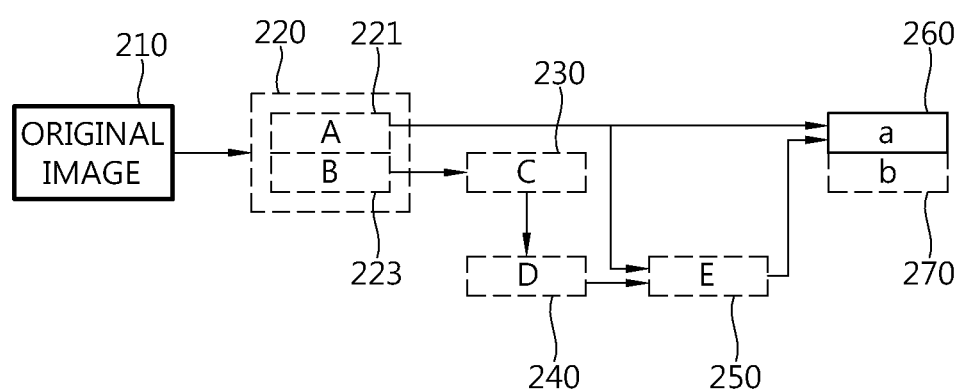
FIG. 2 is a diagram showing an example of an image coding process using skip coding according to the exemplary embodiment of the present invention.

FIG. 2 is a diagram showing an example of the image coding process using the skip coding according to the exemplary embodiment of the present invention.

Referring to FIG. 2, an image coding apparatus using the skip coding according to the exemplary embodiment of the present invention performs the skip coding on original images 210 in a block unit. That is, the coding object signals may also be the coding object blocks. The coding object image 220 may include a coding object A block 221 and a B block 223 reconstructed earlier than the coding object A block 221. The filtering unit 110 performs filtering on the reconstructed B block 223. In this case, the filtering may be performed using at least one of the low pass filter, the deblocking filter, the adaptive loop filter, the interpolation filter, or the noise removing filter on the reconstructed signals. The filtering unit 110 may generate a C block 230 by performing the filtering on the reconstructed B block 223. The predictive signal generator 120 generates a predictive D block 240 of the coding object A block 221 by using the C block 230. In this case, the predictive D block 240 may be generated by one of the line based intra prediction, the template matching, the displaced intra prediction, the inter-layer intra prediction, or the inter-view intra prediction. The skip coder 130 may be set the predictive D block 240 as the reconstructed blocks of the coding object A block 221. The reconstructed block may be used when the B block is skip-coded. The skip coder 130 may generate a remaining E block 250 by removing the predictive D block 240 from the coding object A block 221. The skip coder 130 may perform the skip coding on the coding object A block 221 by not coding the remaining E block 250 included in the coding object A block 221. The skip coder 130 may generate a block 260 that is skip-coded. Thereafter, the coding object image 220 may be skip-coded by continuously setting a B block 270 as the coding object block.

Figure 3:
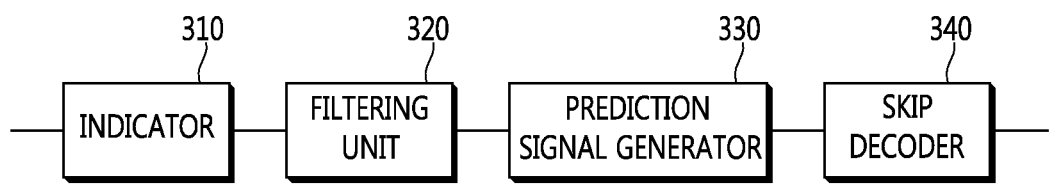
FIG. 3 is a block diagram of an image decoding apparatus using skip coding according to another exemplary embodiment of the present invention.

FIG. 3 is a block diagram of an image decoding apparatus using skip coding according to an exemplary embodiment of the present invention.

Referring to FIG. 3, the image decoding apparatus using the skip coding according to the exemplary embodiment of the present invention may include an indicator 310, a filtering unit 320, a prediction signal generator 330, and a skip decoder 340.

The indicator 310 may indicate that the skip coder performs the skip coding on the coding object signals without coding the residual signals at the time of performing the intra prediction. The indicator 310 indicating the skip coding may have a flag type or a macroblock mode type. The indicator 310 may be identified while being included in the decoding object signal within the decoding object images. In addition, the indicator 310 may indicate the method of generating the prediction signals during the skip coding process. That is, the indicator 310 may indicate that the prediction signals of the coding object signals are generated by any one of the line based intra prediction, template matching, the displaced intra prediction, the inter-layer intra prediction, and the inter-view intra prediction. In addition, the indicator 310 may indicate the filtering method. That is, the indicator 310 may indicate that the filtering is performed by any one of the filtering methods for the reconstructed signals including the low pass filter, the deblocking filter, the adaptive loop filter, the interpolation filter, or the noise removing filter. In addition, the indicator 310 may indicate that at least one of the filtering methods for the reconstructed signals is performed. For example, the indicator 310 may indicate whether the low pass filter is applied to the reconstructed signals and the deblocking filter is applied thereto, whether the low pass filter is applied to the reconstructed signals and the interpolation filter is applied thereto, the deblocking filter is applied to the reconstructed signals and the adaptive loop filter is applied thereto, whether the adaptive loop filter is applied to the reconstructed signals and the interpolation filter is applied thereto, whether the low pass filter is applied to the reconstructed signals, the deblocking filter is applied thereto, and the adaptive loop filter is applied thereto, whether the low pass filter is applied to the reconstructed signals, the deblocking filter is applied thereto, and the interpolation filter is applied thereto, and the deblocking filter is applied to the reconstructed signals, the adaptive loop filter is applied thereto, and the interpolation filter is applied thereto. The coder performs the entropy coding on the indicator by the arithmetic coding, the variable length coding, or the like, and inserts the entropy coded indicator into the bitstream. The decoder performs the entropy decoding on the entropy coded indicator 310 in the bitstream, thereby discriminating whether or not the skip coding is performed, the method of generating the prediction signals, or the filtering method.

The filtering unit 320 performs the filtering on the signals reconstructed earlier than the decoding object signals, based on the filtering method used during the process of coding the indicator 310. The decoding object signals may be signals obtained by differentiating the decoding object images in a unit of a pixel, a block, a unit, a picture, and a frame. That is, the decoding object signals conceptually include a decoding object pixel, a decoding object block, a decoding object unit, a decoding object picture, and a decoding object frame. The filtering unit 320 similar to the filtering unit 110 of the image coding apparatus using the skip coding may perform the filtering using at least one of the low pass filter, the deblocking filter, the adaptive loop filter, the interpolation filter, or the noise removing filter on the reconstructed signals. In this case, the filtering unit 320 may step-by-step perform at least one of the low pass filter, the deblocking filter, the adaptive loop filter, the interpolation filter, or the noise removing filter on the reconstructed signals. The filtering unit 320 may perform filtering on the reconstructed signals by similarly applying the filtering method that is applied during the coding process.

The prediction signal generator 330 generates the prediction signals of the decoding object signals, based on the reconstructed signals filtered in the filtering unit 320 and the indicator 310. The prediction signal generator 330 may generate the prediction signals of the decoding object signals, based on the method of generating the prediction signals used during the process of coding the indicator 310. The prediction signal generator 330 may generate the prediction signals of the decoding object signals by one of the line based intra prediction, the template matching, the displaced intra prediction, the inter-layer intra prediction, and the inter-view intra prediction. The prediction signal generator 330 may generate the prediction signals of the decoding object signals by applying a method similar to the method of generating the prediction signals applied by the prediction signal generator 120 during the coding process.

The skip decoder 340 decodes the decoding object signals using the prediction signals without decoding the residual signals. The skip decoder 340 performs the skip decoding on the decoding object signals by not decoding the residual signals in the decoding object signals. The skip decoder 340 does not perform the inverse transform, the dequantization, and the entropy decoding on the residual signals.

Figure 4:
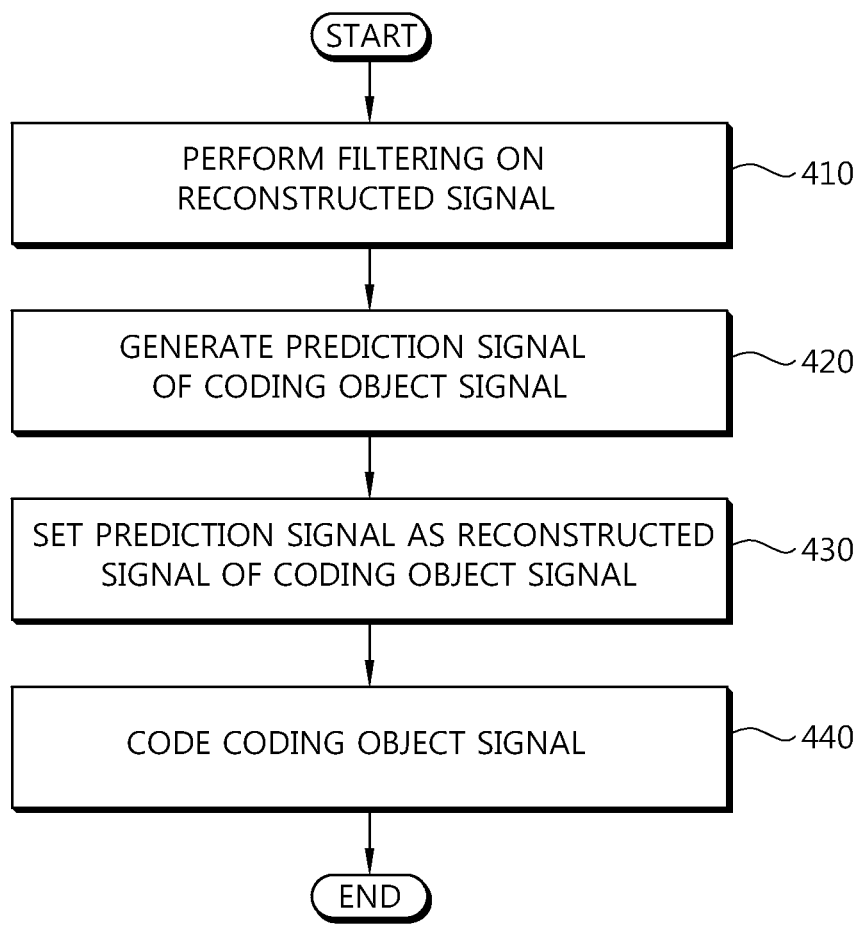
FIG. 4 is a flow chart of an image coding method using skip coding according to another exemplary embodiment of the present invention.

FIG. 4 is a flow chart of the image coding method using the skip coding according to another exemplary embodiment of the present invention.

At step 410, the image coding apparatus using the skip coding according to the exemplary embodiment of the present invention performs filtering on the signals reconstructed earlier than the coding object signals within the coding object images at the time of performing the intra prediction. In this case, the filtering may be performed using at least one of the low pass filter, the deblocking filter, the adaptive loop filter, the interpolation filter, and the noise removing filter on the reconstructed signals. In this case, the filtering may be step-by-step performed using at least one of the low pass filter, the deblocking filter, the adaptive loop filter, the interpolation filter, or the noise removing filter on the reconstructed signals.

At step 420, the image coding apparatus using the skip coding according to the exemplary embodiment of the present invention generates the prediction signals of the coding object signals by using the filtered reconstructed signals. In this case, the prediction signals may be generated by one of the line based intra prediction, template matching, the displaced intra prediction, the inter-layer intra prediction, and the inter-view intra prediction.

At step 430, the image coding apparatus using the skip coding according to the exemplary embodiment of the present invention sets the generated prediction signals as the reconstructed signals of the coding object signals. The set reconstructed signals may be used at the time of coding the next coding object signals of the coding object images.

At step 440, the image coding apparatus using the skip coding according to the exemplary embodiment of the present invention performs the skip coding on the coding object signals by not coding the residual signals.

As described above, the coded image data are transmitted to the image decoding apparatus as shown in FIG. 3. The image decoding apparatus may perform the image decoding method as described above in detail in the description of FIG. 3, according to the above-mentioned image coding method (see FIG. 4).

The methods according to the exemplary embodiment of the present invention may be implemented as a program instruction type that may be performed through various computer units and may be recorded in a computer readable medium. The computer readable medium may include program instructions, data files, data structure, or the like, alone or a combination thereof. The program instructions recorded in the medium may be ones particularly designed and configured to meet the present invention, computer software, or usable ones known to those skilled in the art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Accordingly, such modifications, additions and substitutions should also be understood to fall within the scope of the present invention.

What is claimed is:

1. An image decoding method performed by a decoding apparatus, comprising:
    determining whether to perform filtering on signals to be used for generating intra prediction signals of decoding target signals, the signals being reconstructed earlier than the decoding target signals, the signals being adjacent to the decoding target signals;
    performing the filtering on the signals when the filtering is determined to be performed;
    generating the intra prediction signals of the decoding target signals based on the filtered signals; and
    reconstructing the decoding target signals based on the intra prediction signals,
    wherein whether to perform the filtering is determined based on a block size and an intra prediction mode of the decoding target signals,
    wherein a tap size of a filter used for the filtering or a coefficient of the filter is variably determined based on a strength of the filter, and
    wherein available tap sizes for the filter comprise 2-tap and 3-tap.

2. An image encoding method performed by an encoding apparatus, comprising:
    determining whether to perform filtering on signals to be used for generating intra prediction signals of encoding target signals, the signals being reconstructed earlier than the encoding target signals, the signals being adjacent to the encoding target signals;
    performing the filtering on the signals when the filtering is determined to be performed;
    generating the intra prediction signals of the encoding target signals based on the filtered signals; and
    encoding the encoding target signals based on the intra prediction signals,
    wherein whether to perform the filtering is determined based on a block size and an intra prediction mode of the encoding target signals,
    wherein a tap size of a filter used for the filtering or a coefficient of the filter is variably determined based on a strength of the filter, and
    wherein available tap sizes for the filter comprise 2-tap and 3-tap.

3. A non-transitory computer-readable recording medium storing a bitstream, wherein the bitstream is generated by an image encoding method, the image encoding method comprising:
    determining whether to perform filtering on signals to be used for generating intra prediction signals of encoding target signals, the signals being reconstructed earlier than the encoding target signals, the signals being adjacent to the encoding target signals;
    performing the filtering on the signals when the filtering is determined to be performed;
        generating the intra prediction signals of the encoding target signals based on the filtered signals; and
    encoding the encoding target signals based on the intra prediction signals,
    wherein whether to perform the filtering is determined based on a block size and an intra prediction mode of the encoding target signals,
    wherein a tap size of a filter used for the filtering or a coefficient of the filter is variably determined based on a strength of the filter, and
    wherein available tap sizes for the filter comprise 2-tap and 3-tap.

* * * * *